(12) United States Patent
Wu (10) Patent No.: US 10,419,950 B2
(45) Date of Patent: Sep. 17, 2019

(54) MONITORING PROCESSING METHOD AND DEVICE

(71) Applicant: ZTE Corporation, Shenzhen (CN)

(72) Inventor: Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 100 days.

(21) Appl. No.: 15/550,938

(22) PCT Filed: Aug. 13, 2015

(86) PCT No.: PCT/CN2015/086903
§ 371 (c)(1),
(2) Date: Aug. 14, 2017

(87) PCT Pub. No.: WO2016/127612
PCT Pub. Date: Aug. 18, 2016

(65) Prior Publication Data
US 2018/0035313 A1    Feb. 1, 2018

(30) Foreign Application Priority Data
Feb. 12, 2015    (CN) .......................... 2015 1 0076618

(51) Int. Cl.
*H04L 12/26*    (2006.01)
*H04W 24/02*    (2009.01)
(Continued)

(52) U.S. Cl.
CPC ............. *H04W 24/02* (2013.01); *H04L 43/00* (2013.01); *H04W 4/70* (2018.02); *H04W 8/18* (2013.01)

(58) Field of Classification Search
None
See application file for complete search history.

(56) References Cited

U.S. PATENT DOCUMENTS 6,930,985 B1 * 8/2005 Rathi ...................... H04L 41/08
370/254
2013/0297791 A1 * 11/2013 Fallon ................. H04L 41/5032
709/224
(Continued)

FOREIGN PATENT DOCUMENTS

CN    101635653 A    1/2010
CN    102057646 A    5/2011
(Continued)

OTHER PUBLICATIONS

International Search Report for corresponding application PCT/CN2015/086903 filed on Aug. 13, 2015; dated Nov. 11, 2015.
(Continued)

*Primary Examiner* — Brian S Roberts
(74) *Attorney, Agent, or Firm* — Cantor Colburn LLP (57) ABSTRACT

A monitoring processing method and device are provided. In a monitoring processing method, a monitoring receiver receives a monitoring request message sent by a monitoring initiator, and the monitoring request message contains a monitoring task; and the monitoring receiver may interact with at least one of the monitoring initiator and a monitoring executor based on a monitoring identifier corresponding to the monitoring task to execute monitoring processing.

12 Claims, 4 Drawing Sheets

Receive a monitoring request message sent by a monitoring initiator — S102

Interact with the monitoring initiator and/or a monitoring executor based on a monitoring identifier corresponding to the monitoring task to execute monitoring processing — S104

(51) Int. Cl.
*H04W 4/70* (2018.01)
*H04W 8/18* (2009.01)

(56) References Cited

U.S. PATENT DOCUMENTS

| | | | | |
|---|---|---|---|---|
| 2014/0045452 | A1* | 2/2014 | Ma | H04L 67/141 |
| | | | | 455/406 |
| 2014/0134996 | A1 | 5/2014 | Barclay | |
| 2015/0382132 | A1* | 12/2015 | Wu | H04W 4/70 |
| | | | | 370/328 |
| 2016/0007138 | A1* | 1/2016 | Palanisamy | H04W 4/70 |
| | | | | 455/41.2 |
| 2016/0337841 | A1* | 11/2016 | Won | H04W 4/70 |

FOREIGN PATENT DOCUMENTS

| | | |
|---|---|---|
| CN | 103442330 A | 12/2013 |
| CN | 103716822 A | 4/2014 |
| WO | 2014056344 A1 | 4/2014 |

OTHER PUBLICATIONS

European Search Report for corresponding application EP 15 88 1769; Report dated Mar. 9, 2018.

* cited by examiner

MONITORING PROCESSING METHOD AND DEVICE

TECHNICAL FIELD

The present disclosure relates to the field of communications, and particularly to a monitoring processing method and device.

BACKGROUND

A Machine to Machine (M2M) network may include numerous M2M terminals. M2M applications may run on M2M terminals, and the M2M terminals may be connected to a service platform of a network side through a bottom-layer bearer network, such as a Global System for Mobile Communications (GSM), Wideband Code Division Multiple Access (WCDMA) and Wireless Fidelity (WiFi). Therefore, an administrator of an M2M application may monitor a running status of an M2M terminal by accessing the service platform of the network side.

For example, an administrator of an intelligent traffic monitoring system may be connected to a service platform of a network side via the Internet. The administrator may send to the service platform an instruction of monitoring a connected status of each of one or more monitoring cameras on a road, and may receive alarm information from the service platform after it is detected that a certain monitoring camera is disconnected.

A monitoring task similar to the above scenario is fulfilled in a conventional manner. For example, in order to learn about whether one or more M2M terminals are online or not, an application or a service platform may need to send a polling instruction to the one or more M2M terminals. If a feedback of a certain M2M terminal is normally received, it may represent that this M2M terminal is still online. If no feedback of a certain M2M terminal is received within a designated time, it may represent that this M2M terminal has been disconnected.

However, such a monitoring solution not only makes operations of a service platform and a corresponding application complex, but also is low in monitoring efficiency of a monitoring task.

SUMMARY

Some exemplary embodiments of the present disclosure provide a monitoring processing method and device, which may at least solve a problem that a monitoring solution not only makes operations of a service platform and a corresponding application complex, but also is low in monitoring efficiency of a monitoring task.

According to an exemplary embodiment of the present disclosure, a monitoring processing method is provided, which may include the following acts. A monitoring receiver may receive a monitoring request message sent by a monitoring initiator, and the monitoring request message may contain a monitoring task. The monitoring receiver may interact with at least one of the monitoring initiator and a monitoring executor based on a monitoring identifier corresponding to the monitoring task to execute monitoring processing.

In an exemplary embodiment, the monitoring identifier may be allocated by the monitoring initiator, and may be contained in the monitoring request message; alternatively, the monitoring identifier may be allocated to the monitoring task in the monitoring request message by the monitoring receiver after the monitoring receiver receives the monitoring request message sent by the monitoring initiator.

In an exemplary embodiment, the act that the monitoring receiver interacts with the monitoring executor based on the monitoring identifier corresponding to the monitoring task to execute monitoring processing may include the following act. The monitoring receiver may send a monitoring execution request message to the monitoring executor, and the monitoring execution request message may contain the monitoring identifier and the monitoring task.

In an exemplary embodiment, before the act that the monitoring receiver sends the monitoring execution request message to the monitoring executor, the method may further include the following acts. A subscription data request message may be sent to a Home Subscriber Server (HSS), and the subscription data request message may carry at least one of a terminal identifier and the monitoring identifier, the terminal identifier identifies a terminal corresponding to the monitoring task. The monitoring executor configured to execute the monitoring task may be determined based on a subscription data response message received from the HSS.

In an exemplary embodiment, the act that the monitoring receiver interacts with at least one of the monitoring initiator and the monitoring executor based on the monitoring identifier corresponding to the monitoring task to execute monitoring processing may include the following acts. The monitoring receiver may receive from the monitoring initiator a monitoring termination request message requesting to terminate the monitoring task, and the monitoring termination request message may contain the monitoring identifier indicating the monitoring task to be terminated. The monitoring receiver may send, to the monitoring executor based on the monitoring termination request message, a monitoring stopping request message indicating the monitoring executor to terminate the monitoring task based on the monitoring identifier, and the monitoring stopping request message may contain the monitoring identifier indicating the monitoring task to be terminated.

In an exemplary embodiment, the act that the monitoring receiver interacts with at least one of the monitoring initiator and the monitoring executor based on the monitoring identifier corresponding to the monitoring task to execute monitoring processing may include the following acts. The monitoring receiver may receive from the monitoring initiator a monitoring updating request message requesting to update the monitoring task, and the monitoring updating request message may contain the monitoring identifier indicating the monitoring task to be updated and an updated monitoring parameter of the monitoring task. The monitoring receiver may send, to the monitoring executor based on the monitoring updating request message, a monitoring updating request message indicating the monitoring executor to update the monitoring task based on the monitoring identifier and the updated monitoring parameter, and the monitoring updating request message may contain the monitoring identifier indicating the monitoring task to be updated and the updated monitoring parameter of the monitoring task.

In an exemplary embodiment, the monitoring task may include at least one of the following monitoring parameters: a monitored terminal, a monitored event, the number of monitoring reporting times, a monitoring duration, a monitoring starting time, a monitoring ending time, and an operation to be executed after occurrence of a monitored event.

According to another exemplary embodiment of the present disclosure, a monitoring processing method is provided, which may include the following acts. A monitoring executor may receive a monitoring execution request message sent by a monitoring receiver, and the monitoring execution request message may contain a monitoring identifier identifying a monitoring task and the monitoring task. The monitoring executor may execute monitoring processing on the monitoring task corresponding to the monitoring identifier.

In an exemplary embodiment, after the act that the monitoring executor receives the monitoring execution request message sent by the monitoring receiver, the method may further include the following act: the monitoring executor may receive from the monitoring receiver a monitoring stopping request message requesting to terminate the monitoring task, and the monitoring stopping request message may contain the monitoring identifier indicating the monitoring task to be terminated. The act that the monitoring executor executes monitoring processing on the monitoring task corresponding to the monitoring identifier may include the monitoring executor deletes the monitoring task based on the monitoring identifier.

In an exemplary embodiment, after the act that the monitoring executor receives the monitoring execution request message sent by the monitoring receiver, the method may further include the following act: the monitoring executor may receive from the monitoring receiver a monitoring updating request message requesting to update the monitoring task, and the monitoring updating request message may contain the monitoring identifier indicating the monitoring task to be updated and an updated monitoring parameter of the monitoring task. The act that the monitoring executor executes monitoring processing on the monitoring task corresponding to the monitoring identifier may include the monitoring executor updates a monitoring parameter of the monitoring task into the received monitoring parameter of the monitoring task based on the monitoring identifier in the monitoring updating request message and the updated monitoring parameter of the monitoring task.

In an exemplary embodiment, the monitoring task may include at least one of the following monitoring parameters: a monitored terminal, a monitored event, the number of monitoring reporting times, a monitoring duration, a monitoring starting time, a monitoring ending time, and an operation to be executed after occurrence of a monitored event.

According to an exemplary embodiment of the present disclosure, a monitoring processing device is provided, which may be applied to a monitoring receiver and include a first receiving module and a first processing module. The first receiving module may be configured to receive a monitoring request message sent by a monitoring initiator, and in the exemplary embodiment, the monitoring request message may contain a monitoring task. The first processing module may be configured to interact with at least one of the monitoring initiator and a monitoring executor based on a monitoring identifier corresponding to the monitoring task to execute monitoring processing.

In an exemplary embodiment, the monitoring identifier may be allocated by the monitoring initiator, and may be contained in the monitoring request message; alternatively, the monitoring identifier may be allocated to the monitoring task in the monitoring request message by the monitoring receiver after the monitoring receiver receives the monitoring request message sent by the monitoring initiator.

In an exemplary embodiment, the first processing module may include a first sending unit. The first sending unit may be configured to send a monitoring execution request message to the monitoring executor, and in the exemplary embodiment, the monitoring execution request message may contain the monitoring identifier and the monitoring task.

In an exemplary embodiment, the first processing module may further include a second sending unit and a first determination unit. The second sending unit may be configured to send a subscription data request message to an HSS, and in the exemplary embodiment, the subscription data request message may contain at least one of a terminal identifier and the monitoring identifier, the terminal identifier identifies a terminal corresponding to the monitoring task. The first determination unit may be configured to determine, based on a subscription data response message received from the HSS, the monitoring executor configured to execute the monitoring task.

In an exemplary embodiment, the first processing module may include a first receiving unit and a third sending unit. The first receiving unit may be configured to receive from the monitoring initiator a monitoring termination request message requesting to terminate the monitoring task, and in the exemplary embodiment, the monitoring termination request message may contain the monitoring identifier indicating the monitoring task to be terminated. The third sending unit may be configured to send, to the monitoring executor based on the monitoring termination request message, a monitoring stopping request message indicating the monitoring executor to terminate the monitoring task based on the monitoring identifier, and in the exemplary embodiment, the monitoring stopping request message may contain the monitoring identifier indicating the monitoring task to be terminated.

In an exemplary embodiment, the first processing module may include a second receiving unit and a fourth sending unit. The second receiving unit may be configured to receive from the monitoring initiator a monitoring updating request message requesting to update the monitoring task, and in the exemplary embodiment, the monitoring updating request message may contain the monitoring identifier indicating the monitoring task to be updated and an updated monitoring parameter of the monitoring task. The fourth sending unit may be configured to send, to the monitoring executor based on the monitoring updating request message, a monitoring updating request message indicating the monitoring executor to update the monitoring task based on the monitoring identifier and the updated monitoring parameter, and in the exemplary embodiment, the monitoring updating request message may contain the monitoring identifier indicating the monitoring task to be updated and the updated monitoring parameter of the monitoring task.

In an exemplary embodiment, the monitoring task may include at least one of the following monitoring parameters: a monitored terminal, a monitored event, the number of monitoring reporting times, a monitoring duration, a monitoring starting time, a monitoring ending time, and an operation to be executed after occurrence of a monitored event.

According to another exemplary embodiment of the present disclosure, an interface network element is provided, which may be located in a bearer network and include any abovementioned device.

In an exemplary embodiment, the interface network element may include at least one of: a Service Capability Exposure Function (SCEF) and an InterWorking Function (IWF).

According to an exemplary embodiment of the present disclosure, a monitoring processing device is provided, which may be applied to a monitoring executor and include a second receiving module and a second processing module.

The second receiving module may be configured to receive a monitoring execution request message sent by a monitoring receiver, and in the exemplary embodiment, the monitoring execution request message may contain a monitoring identifier identifying a monitoring task and the monitoring task. The second processing module may be configured to execute monitoring processing on the monitoring task based on the monitoring identifier.

In an exemplary embodiment, the device may further include a third receiving module. The third receiving module may be configured to receive from the monitoring receiver a monitoring stopping request message requesting to terminate the monitoring task, and in the exemplary embodiment, the monitoring stopping request message may contain the monitoring identifier indicating the monitoring task to be terminated. The second processing module may further be configured to delete the monitoring task based on the monitoring identifier.

In an exemplary embodiment, the device may further include a fourth receiving module. The fourth receiving module may be configured to receive from the monitoring receiver a monitoring updating request message requesting to update the monitoring task, and in the exemplary embodiment, the monitoring updating request message may contain the monitoring identifier indicating the monitoring task to be updated and an updated monitoring parameter of the monitoring task. The second processing module may further be configured to update a monitoring parameter of the monitoring task into the received monitoring parameter of the monitoring task based on the monitoring identifier in the monitoring updating request message and the updated monitoring parameter of the monitoring task.

In an exemplary embodiment, the monitoring task may include at least one of the following monitoring parameters: a monitored terminal, a monitored event, the number of monitoring reporting times, a monitoring duration, a monitoring starting time, a monitoring ending time, and an operation to be executed after occurrence of a monitored event.

According to another exemplary embodiment of the present disclosure, monitoring equipment is provided, which may be located in a bearer network and include any above-mentioned device.

In an exemplary embodiment, the monitoring equipment may include at least one of: an HSS, a Mobility Management Entity (MME) and a Serving General Packet Radio Service (GPRS) Supporting Node (SGSN).

According to some exemplary embodiments of the present disclosure, a monitoring receiver may receive a monitoring request message sent by a monitoring initiator, the monitoring request message may contain a monitoring task; and the monitoring receiver may interact with at least one of the monitoring initiator and a monitoring executor based on a monitoring identifier corresponding to the monitoring task to execute monitoring processing. By virtue of the solution in some embodiments of the present disclosure, a problem that a monitoring solution not only makes operations of a service platform and a corresponding application complex, but also is low in monitoring efficiency of the monitoring task may be solved. In addition, by executing monitoring processing by interaction based on the monitoring identifier corresponding to the monitoring task, effects of not only effectively reducing a monitoring complexity and monitoring cost but also improving the monitoring efficiency may be achieved.

DETAILED DESCRIPTION OF THE EMBODIMENTS

Figure 1:
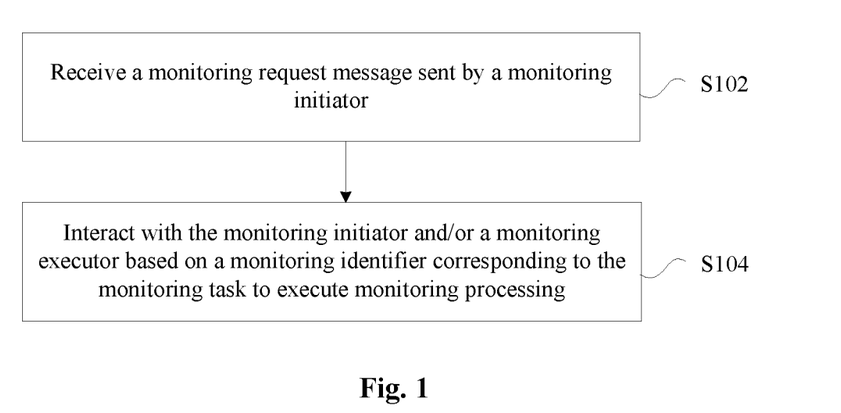
FIG. 1 is a flowchart of a first implementation of a monitoring processing method according to an exemplary embodiment of the present disclosure.

An exemplary embodiment provides a monitoring processing method. FIG. 1 is a flowchart of a first implementation of a monitoring processing method according to an exemplary embodiment of the present disclosure. As shown in FIG. 1, the flow may include the following acts.

At act S102, a monitoring receiver may receive a monitoring request message sent by a monitoring initiator, and in this exemplary embodiment, the monitoring request message may contain a monitoring task.

At act S104, the monitoring receiver may interact with at least one of the monitoring initiator and a monitoring executor based on a monitoring identifier corresponding to the monitoring task to execute monitoring processing.

By the acts, monitoring processing may be executed by interaction based on the monitoring identifier corresponding to the monitoring task, so that a problem that a monitoring solution not only makes operations of a service platform and a corresponding application complex, but also is low in monitoring efficiency of the monitoring task may be solved.

In addition, effects of effectively reducing a monitoring complexity and monitoring cost and improving the monitoring efficiency may be achieved.

It may be noted that there may be various sources of the monitoring identifier. For example, the monitoring identifier may be allocated by the monitoring initiator, and is carried in the monitoring request message. The monitoring identifier may also be allocated to the monitoring task in the monitoring request message by the monitoring receiver after the monitoring receiver receives the monitoring request message sent by the monitoring initiator.

It should be noted that "monitoring processing" mentioned here may refer to, but not limited to, one or more operations selected from a series of monitoring related operations executed by the monitoring receiver. For example, the monitoring processing may include a related operation of sending the monitoring task to the monitoring executor to indicate the monitoring executor to execute monitoring on the monitoring task. Alternatively, the monitoring processing may include a related operation of sending to the monitoring executor a monitoring stopping request message indicating the monitoring executor to terminate the monitoring task based on the monitoring identifier. Alternatively, the monitoring processing may include a related operation of sending to the monitoring executor a monitoring updating request message indicating the monitoring executor to update the monitoring task based on the monitoring identifier and an updated monitoring parameter. Descriptions will be made below respectively.

For example, the act that the monitoring receiver interacts with the monitoring executor based on the monitoring identifier corresponding to the monitoring task to execute monitoring processing may include the following acts. The monitoring receiver may send a monitoring execution request message to the monitoring executor, and in this exemplary embodiment, the monitoring execution request message may contain the monitoring identifier and the monitoring task. Monitoring processing may be performed on the monitoring task corresponding to the monitoring identifier based on the monitoring identifier.

In the exemplary embodiment, before the act that the monitoring receiver sends the monitoring execution request message to the monitoring executor, the monitoring executor corresponding to the monitoring task may be determined. There may be various manners for determining the executor of the monitoring task. For example, the following exemplary manner may be adopted. A subscription data request message may be sent to an HSS, and in this exemplary embodiment, the subscription data request message may carry at least one of a terminal identifier and the monitoring identifier, the terminal identifier identifies a terminal corresponding to the monitoring task. The monitoring executor configured to execute the monitoring task may be determined based on a subscription data response message received from the HSS.

For another example, the act that the monitoring receiver interacts with at least one of the monitoring initiator and the monitoring executor based on the monitoring identifier corresponding to the monitoring task to execute monitoring processing may alternatively include the following acts. The monitoring receiver may receive from the monitoring initiator a monitoring termination request message requesting to terminate the monitoring task, and in this exemplary embodiment, the monitoring termination request message may contain the monitoring identifier indicating the monitoring task to be terminated. The monitoring receiver may send, to the monitoring executor based on the monitoring termination request message, a monitoring stopping request message indicating the monitoring executor to terminate the monitoring task based on the monitoring identifier, and in this exemplary embodiment, the monitoring stopping request message may contain the monitoring identifier indicating the monitoring task to be terminated. That is, a deletion operation may be executed on the monitoring task corresponding to the monitoring identifier based on the monitoring identifier.

For another example, the act that the monitoring receiver interacts with at least one of the monitoring initiator and the monitoring executor based on the monitoring identifier corresponding to the monitoring task to execute monitoring processing may further include the following acts. The monitoring receiver may receive from the monitoring initiator a monitoring updating request message requesting to update the monitoring task, and in this exemplary embodiment, the monitoring updating request message may contain the monitoring identifier indicating the monitoring task to be updated and an updated monitoring parameter of the monitoring task. The monitoring receiver may send, to the monitoring executor based on the monitoring updating request message, a monitoring updating request message indicating the monitoring executor to update the monitoring task based on the monitoring identifier and the updated monitoring parameter, and in this exemplary embodiment, the monitoring updating request message may contain the monitoring identifier indicating the monitoring task to be updated and the updated monitoring parameter of the monitoring task. That is, an updating operation may be performed on the monitoring task corresponding to the monitoring identifier based on the monitoring identifier.

It may be noted that the monitoring task may include various monitoring parameters, and for example, may include at least one of: a monitored terminal, a monitored event, the number of monitoring reporting times, a monitoring duration, a monitoring starting time, a monitoring ending time, and an operation to be executed after occurrence of a monitored event.

Figure 2:
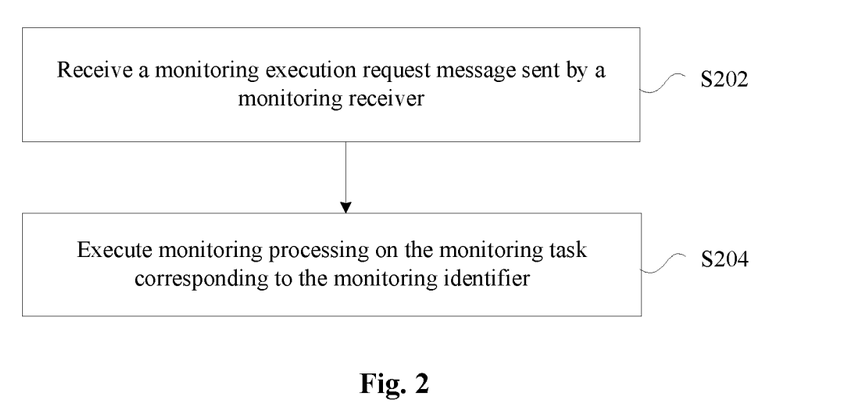
FIG. 2 is a flowchart of a second implementation of a monitoring processing method according to an exemplary embodiment of the present disclosure.

FIG. 2 is a flowchart of a second implementation of a monitoring processing method according to an exemplary embodiment of the present disclosure. As shown in FIG. 2, the flow may include the following acts.

At act S202, a monitoring executor may receive a monitoring execution request message sent by a monitoring receiver, and in this exemplary embodiment, the monitoring execution request message may contain a monitoring identifier identifying a monitoring task and the monitoring task.

At act S204, the monitoring executor may execute monitoring processing on the monitoring task corresponding to the monitoring identifier.

By the acts, monitoring processing may be executed by interaction based on the monitoring identifier corresponding to the monitoring task, so that a problem that a monitoring solution not only makes operations of a service platform and a corresponding application complex, but also is low in monitoring efficiency of the monitoring task may be solved. In addition, effects of effectively reducing a monitoring complexity and monitoring cost and improving the monitoring efficiency may be further achieved.

Correspondingly, "monitoring processing" mentioned here may refer to, but not limited to, one or more operations selected from a series of monitoring related operations executed by the monitoring executor. For example, the monitoring processing may include a monitoring operation over the monitoring task, and may alternatively and/or additionally include updating and deletion operation processing over the monitoring task. Descriptions will be made below respectively.

For example, the act that the monitoring executor executes monitoring processing on the monitoring task corresponding to the monitoring identifier may include the following act. The monitoring executor may execute the monitoring operation based on the received monitoring task sent by the monitoring receiver.

For another example, after the act that the monitoring executor receives the monitoring execution request message sent by the monitoring receiver, the monitoring executor may also receive from the monitoring receiver a monitoring stopping request message requesting to terminate the monitoring task, and in this exemplary embodiment, the monitoring stopping request message may contain the monitoring identifier indicating the monitoring task to be terminated. Then, the act that the monitoring executor executes monitoring processing on the monitoring task corresponding to the monitoring identifier may include an act that the monitoring executor may delete the monitoring task based on the monitoring identifier.

For another example, after the act that the monitoring executor receives the monitoring execution request message sent by the monitoring receiver, the monitoring executor may further receive from the monitoring receiver a monitoring updating request message requesting to update the monitoring task, and in this exemplary embodiment, the monitoring updating request message may contain the monitoring identifier indicating the monitoring task to be updated and an updated monitoring parameter of the monitoring task. Then, the act that the monitoring executor executes monitoring processing on the monitoring task corresponding to the monitoring identifier may include an act that the monitoring executor may update a monitoring parameter of the monitoring task into the received monitoring parameter of the monitoring task based on the monitoring identifier in the monitoring updating request message and the updated monitoring parameter of the monitoring task.

Correspondingly, the monitoring task may also include at least one of the following monitoring parameters: a monitored terminal, a monitored event, the number of monitoring reporting times, a monitoring duration, a monitoring starting time, a monitoring ending time, and an operation to be executed after occurrence of a monitored event.

An exemplary embodiment provides a monitoring processing device. The device may be configured to implement the abovementioned exemplary embodiments and exemplary implementation modes, and what has been described will not be elaborated. For example, term "module", used below, may be a combination of software and/or hardware capable of realizing a preset function. Although the device described in the following exemplary embodiment is preferably implemented with software, implementation with hardware or a combination of the software and the hardware is also possible and conceivable.

Figure 3:
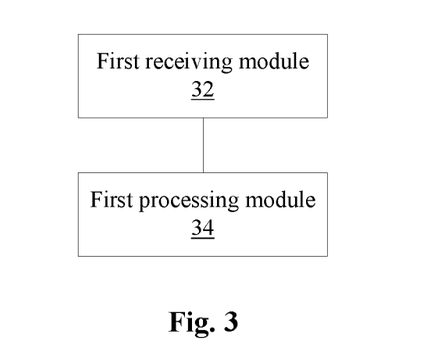
FIG. 3 is a structure block diagram of a first implementation of a monitoring processing device according to an exemplary embodiment of the present disclosure.

FIG. 3 is a structure block diagram of a first implementation of a monitoring processing device according to an exemplary embodiment of the present disclosure. As shown in FIG. 3, the device may be applied to a monitoring receiver, and may include a first receiving module 32 and a first processing module 34. The device will be described below.

The first receiving module 32 may be configured to receive a monitoring request message sent by a monitoring initiator, and in this exemplary embodiment, the monitoring request message may contain a monitoring task. The first processing module 34 may be connected to the first receiving module 32, and may be configured to interact with at least one of the monitoring initiator and a monitoring executor based on a monitoring identifier corresponding to the monitoring task to execute monitoring processing.

In an exemplary embodiment, the monitoring identifier may be allocated by the monitoring initiator, and is carried in the monitoring request message; alternatively, the monitoring identifier may be allocated to the monitoring task in the monitoring request message by the monitoring receiver after the monitoring receiver receives the monitoring request message sent by the monitoring initiator.

Figure 4:
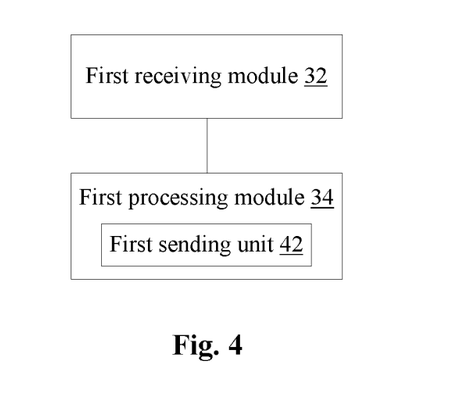
FIG. 4 is an exemplary structure block diagram of a first processing module 34 in a first implementation of a monitoring processing device according to an exemplary embodiment of the present disclosure.

FIG. 4 is a first exemplary structure block diagram of a first processing module 34 in a first implementation of a monitoring processing device according to an exemplary embodiment of the present disclosure. As shown in FIG. 4, the first processing module 34 may include a first sending unit 42. The first sending unit 42 will be described below.

The first sending unit 42 may be configured to send a monitoring execution request message to the monitoring executor, and in this exemplary embodiment, the monitoring execution request message may contain the monitoring identifier and the monitoring task.

Figure 5:
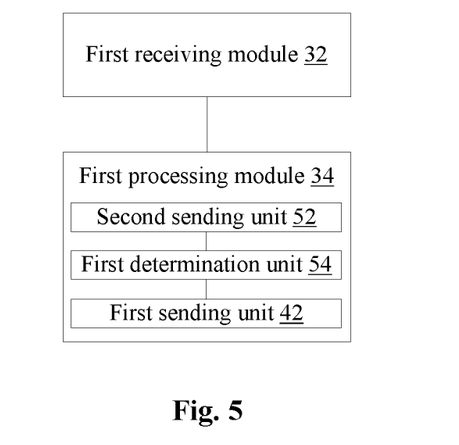
FIG. 5 is an exemplary structure block diagram of a first processing module 34 in a first implementation of a monitoring processing device according to an exemplary embodiment of the present disclosure.

FIG. 5 is a second exemplary structure block diagram of a first processing module 34 in a first implementation of a monitoring processing device according to an exemplary embodiment of the present disclosure. As shown in FIG. 5, the first processing module 34 may further include, besides the structure shown in FIG. 4, a second sending unit 52 and a first determination unit 54. The modules included in the first processing module 34 will be described below.

The second sending unit 52 may be configured to send a subscription data request message to an HSS, and in this exemplary embodiment, the subscription data request message may carry at least one of a terminal identifier and the monitoring identifier, the terminal identifier identifies a terminal corresponding to the monitoring task. The first determination unit 54 may be connected to the second sending unit 52, and may be configured to determine, based on a subscription data response message received from the HSS, the monitoring executor configured to execute the monitoring task.

Figure 6:
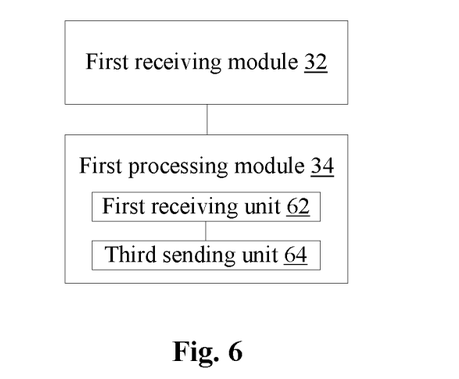
FIG. 6 is an exemplary structure block diagram of a first processing module 34 in a first implementation of a monitoring processing device according to an exemplary embodiment of the present disclosure.

FIG. 6 is a third exemplary structure block diagram of a first processing module 34 in a first implementation of a monitoring processing device according to an exemplary embodiment of the present disclosure. As shown in FIG. 6, the first processing module 34 may include a first receiving unit 62 and a third sending unit 64. The modules included in the first processing module 34 will be described below.

The first receiving unit 62 may be configured to receive from the monitoring initiator a monitoring termination request message requesting to terminate the monitoring task, and in this exemplary embodiment, the monitoring termination request message may contain the monitoring identifier indicating the monitoring task to be terminated. The third sending unit 64 may be connected to the first receiving unit 62, and may be configured to send, to the monitoring executor based on the monitoring termination request message, a monitoring stopping request message indicating the monitoring executor to terminate the monitoring task based on the monitoring identifier, and in this exemplary embodiment, the monitoring stopping request message may contain the monitoring identifier indicating the monitoring task to be terminated.

Figure 7:
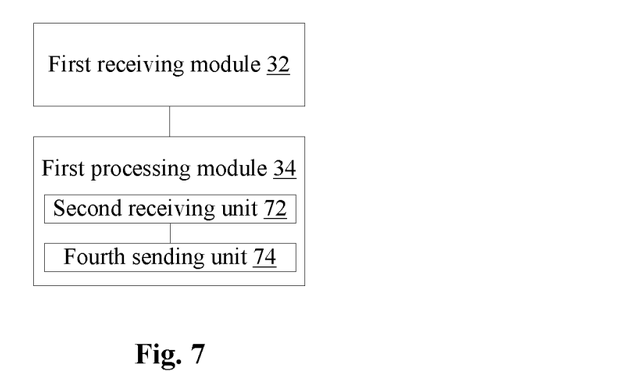
FIG. 7 is an exemplary structure block diagram of a first processing module 34 in a first implementation of a monitoring processing device according to an exemplary embodiment of the present disclosure.

FIG. 7 is a fourth exemplary structure block diagram of a first processing module 34 in a first implementation of a monitoring processing device according to an exemplary embodiment of the present disclosure. As shown in FIG. 7, the first processing module 34 may include a second receiving unit 72 and a fourth sending unit 74. The modules included in the first processing module 34 will be described below.

The second receiving unit 72 may be configured to receive from the monitoring initiator a monitoring updating request message requesting to update the monitoring task, and in this exemplary embodiment, the monitoring updating request message may contain the monitoring identifier indicating the monitoring task to be updated and an updated monitoring parameter of the monitoring task. The fourth sending unit 74 may be connected to the second receiving unit 72, and may be configured to send, to the monitoring executor based on the monitoring updating request message, a monitoring updating request message indicating the monitoring executor to update the monitoring task based on the monitoring identifier and the updated monitoring parameter, and in this exemplary embodiment, the monitoring updating request message may contain the monitoring identifier indicating the monitoring task to be updated and the updated monitoring parameter of the monitoring task.

It may be noted that the monitoring task may include at least one of the following monitoring parameters: a monitored terminal, a monitored event, the number of monitoring reporting times, a monitoring duration, a monitoring starting time, a monitoring ending time, and an operation to be executed after occurrence of a monitored event.

Figure 8:
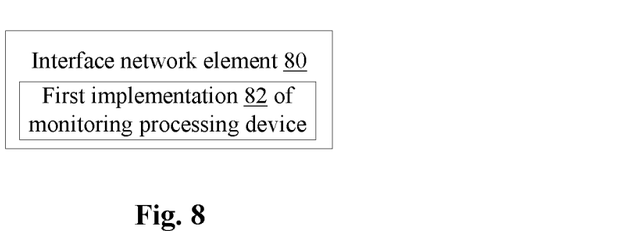
FIG. 8 is a structure block diagram of an interface network element according to an exemplary embodiment of the present disclosure.

FIG. 8 is a structure block diagram of an interface network element according to an exemplary embodiment of the present disclosure. As shown in FIG. 8, the interface network element 80 may be located in a bearer network, and may include any abovementioned structure of the first implementation 82 of a monitoring processing device.

In an exemplary embodiment, the interface network element may include at least one of: an SCEF and an IWF.

Figure 9:
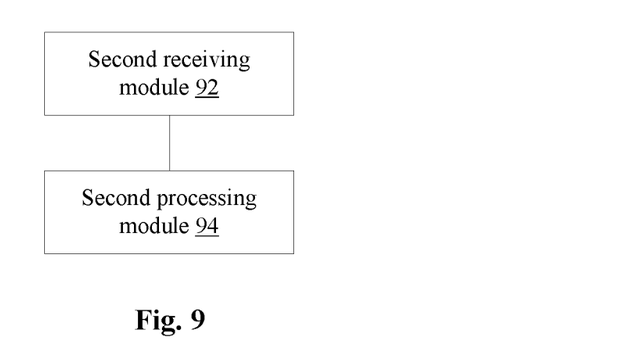
FIG. 9 is a structure block diagram of a second implementation of a monitoring processing device according to an exemplary embodiment of the present disclosure.

FIG. 9 is a structure block diagram of a second implementation of a monitoring processing device according to an exemplary embodiment of the present disclosure. As shown in FIG. 9, the device may be applied to a monitoring executor, and may include a second receiving module 92 and a second processing module 94. The device will be described below.

The second receiving module 92 may be configured to receive a monitoring execution request message sent by a monitoring receiver, and in this exemplary embodiment, the monitoring execution request message may contain a monitoring identifier identifying a monitoring task and the monitoring task. The second processing module 94 may be connected to the second receiving module 92, and may be configured to execute monitoring processing on the monitoring task based on the monitoring identifier.

Figure 10:
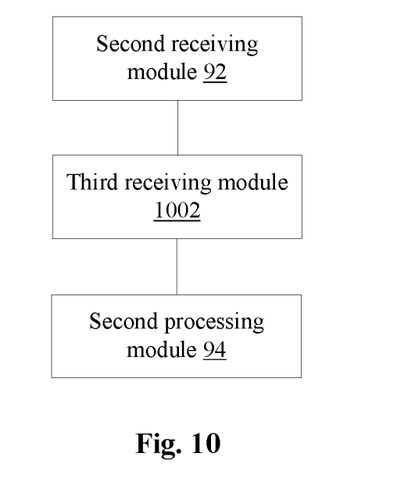
FIG. 10 is a first exemplary structure block diagram of a second implementation of a monitoring processing device according to an exemplary embodiment of the present disclosure.

FIG. 10 is a first exemplary structure block diagram of a second implementation of a monitoring processing device according to an exemplary embodiment of the present disclosure. As shown in FIG. 10, the device may further include, besides all the structures shown in FIG. 9, a third receiving module 1002. The exemplary structure will be described below.

The third receiving module 1002 may be connected to the second receiving module 92, and may be configured to receive from the monitoring receiver a monitoring stopping request message requesting to terminate the monitoring task, and in this exemplary embodiment, the monitoring stopping request message may contain the monitoring identifier indicating the monitoring task to be terminated. The second processing module 94 may be connected to the third receiving module 1002, and may be further configured to delete the monitoring task based on the monitoring identifier.

Figure 11:
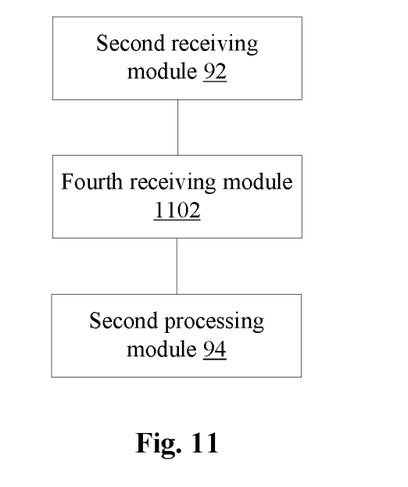
FIG. 11 is a second exemplary structure block diagram of a second implementation of a monitoring processing device according to an exemplary embodiment of the present disclosure.

FIG. 11 is a second exemplary structure block diagram of a second implementation of a monitoring processing device according to an exemplary embodiment of the present disclosure. As shown in FIG. 11, the device may further include, besides all the structures shown in FIG. 9, a fourth receiving module 1102. The exemplary structure will be described below.

The fourth receiving module 1102 may be connected to the second receiving module 92, and may be configured to receive from the monitoring receiver a monitoring updating request message requesting to update the monitoring task, and in this exemplary embodiment, the monitoring updating request message may contain the monitoring identifier indicating the monitoring task to be updated and an updated monitoring parameter of the monitoring task. The second processing module 94 may be connected to the fourth receiving module 1102, and may be further configured to update a monitoring parameter of the monitoring task into the received monitoring parameter of the monitoring task based on the monitoring identifier in the monitoring updating request message and the updated monitoring parameter of the monitoring task.

It may be noted that the monitoring task may include at least one of the following monitoring parameters: a monitored terminal, a monitored event, the number of monitoring reporting times, a monitoring duration, a monitoring starting time, a monitoring ending time, and an operation to be executed after occurrence of a monitored event.

Figure 12:
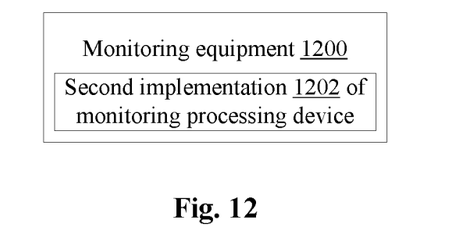
FIG. 12 is a structure block diagram of monitoring equipment according to an exemplary embodiment of the present disclosure.

FIG. 12 is a structure block diagram of monitoring equipment according to an exemplary embodiment of the present disclosure. As shown in FIG. 12, the monitoring equipment 1200 may be located in a bearer network, and may include any abovementioned structure of the second implementation 1202 of the monitoring processing device.

In an exemplary embodiment, the monitoring equipment may include at least one of: an HSS, an MME and an SGSN.

By the abovementioned exemplary embodiments and exemplary implementation modes, a problem that a monitoring solution not only makes operations of a service platform and a corresponding application complex, but also is low in monitoring efficiency of the monitoring task may be solved. In addition, effects of effectively reducing a monitoring complexity and monitoring cost and improving the monitoring efficiency may be achieved.

Compared with a related technique in which monitoring processing over a monitoring task is implemented completely based on an operation of a service layer or an application layer, a manner of executing and managing the monitoring task through a bottom-layer bearer network is adopted for implementation in the exemplary embodiment. Because any M2M terminal may need to be connected to the bottom-layer bearer network, the bottom-layer bearer network may sense whether the terminal connected to the network is online or not and whether the terminal is recovered to be connected or not more directly and more rapidly. The bottom-layer bearer network may also provide more monitoring service, for example, whether the M2M terminal has moved out of a known range or not and whether an equipment number and network access card of the M2M terminal are mismatched or not. In addition, the bottom-layer bearer network may execute a response operation immediately after event detection based on an indication preconfigured by an application or a service platform, for example, denying access of the M2M terminal and reducing a scheduling timeslot of the M2M terminal.

Moreover, after the bottom-layer bearer network executes the monitoring task, operations and complexity of the service platform and the application may be greatly reduced, which makes a design period of the application shorter so that a development period and maintenance cost may be greatly reduced.

A method for executing and managing a monitoring task through a bottom-layer bearer network provided by the exemplary embodiment may mainly include the following contents.

First, an M2M application or a service platform may be called as a monitoring initiator.

The bottom-layer bearer network may have a network element configured to receive a monitoring instruction from the service platform or the application. The network element may interact with the service platform or the application through different interface protocols in the bearer network. The network element may perform protocol conversion on received information, and may manage a service required to be executed by the bearer network. In the exemplary embodiment, the network element receiving the monitoring instruction from the service platform or the application may be called as a monitoring receiver.

The bottom-layer bearer network has a dedicated network element detecting an event to be monitored, for example, an MME, an SGSN and an HSS, which may be called as a monitoring executor in the exemplary embodiment. Considering that monitoring execution of the bearer network may require a coordinated operation of multiple network elements, the monitoring executor may include one or more bearer network elements. For example, the monitoring executor may be, for example, an MME, or an SGSN, or an HSS, or an MME and an HSS, or an SGSN and an HSS.

Therefore, the monitoring task may be executed and managed by the bottom-layer bearer network based on a monitoring identifier. According to different sources of the monitoring identifier, i.e. different main bodies executing monitoring identifier allocation (for example, the monitoring identifier may be allocated by the monitoring receiver, and the monitoring identifier may alternatively be allocated by the monitoring initiator), the following two manners may generally be adopted when the monitoring task is executed based on the monitoring identifier in the exemplary embodiment.

A first manner (the monitoring identifier is allocated by the monitoring receiver) may include the following acts.

At act 1, the monitoring initiator may send a monitoring request message to the monitoring receiver. In this exemplary embodiment, the request message may include a monitoring task. The monitoring task may include parameters, and different combinations of the monitoring parameters may form corresponding monitoring tasks. For example, possible combinations may include, but not limited to, the following combinations:

1) a monitored terminal and an event to be monitored; 2) a monitored terminal, an event to be monitored and the number of monitoring reporting times; 3) a monitored terminal, an event to be monitored and a monitoring duration; 4) a monitored terminal, an event to be monitored, a monitoring starting time and a monitoring ending time; 5) a monitored terminal, an event to be monitored, a monitoring starting time and a monitoring duration; and 6) a monitored terminal, an event to be monitored and an operation to be executed after occurrence of an event.

At act 2, the monitoring receiver may send a response message to the monitoring initiator based on one of the following implementations after receiving the monitoring request message.

At implementation 2.1, the monitoring receiver may allocate a monitoring identifier to the monitoring task and include the monitoring identifier in the response message if confirming that the monitoring task is able to be executed. In this exemplary embodiment, the monitoring identifier may be configured to identify the monitoring task.

At implementation 2.2, the monitoring receiver may indicate denial of execution of the monitoring task in the response message if confirming that the monitoring task is not able to be executed.

At act 3, the monitoring receiver may send the monitoring task to the monitoring executor. In this exemplary embodiment, the monitoring identifier may be included in the monitoring task.

At act 4, the monitoring executor may store the monitoring task.

At act 5, the monitoring executor may send a monitoring report to the monitoring receiver after detecting the event to be monitored. In this exemplary embodiment, the monitoring identifier may be included in the monitoring report.

At act 6, the monitoring receiver may send the monitoring report to the monitoring initiator after receiving the monitoring report.

At act 7, the monitoring initiator may also send a monitoring stopping request message to the monitoring receiver. In this exemplary embodiment, the request message may include the monitoring identifier.

At act 8, the monitoring receiver may send a monitoring termination message to the monitoring executor after receiving the monitoring stopping request message. In this exemplary embodiment, the monitoring identifier may be included in the monitoring termination message.

At act 9, the monitoring executor may check whether the monitoring task associated with the received monitoring identifier is locally stored or not after receiving a monitoring termination instruction. One of the following acts may be executed based on the checking result.

At act 9.1, if the checking result is positive, the monitoring task related to the monitoring identifier may be deleted.

At act 9.2, if the checking result is negative, a monitoring termination denial message may be sent to the monitoring receiver.

At act 10, the monitoring initiator may also send a monitoring updating request message to the monitoring receiver. In this exemplary embodiment, the request message may include the monitoring identifier and a parameter to be updated of the monitoring task. The monitoring identifier may be configured to indicate the specific parameter to be updated of the monitoring task. The parameter to be updated of the monitoring task may include one or more of:

1) a monitored event (the monitored event of the monitoring task corresponding to the monitoring identifier is updated); 2) the number of the monitoring reporting times (the number of the monitoring reporting times for the monitoring task corresponding to the monitoring identifier is updated); 3) the monitoring duration (the monitoring duration of the monitoring task corresponding to the monitoring identifier is updated); 4) the monitoring starting time (the monitoring starting time of the monitoring task corresponding to the monitoring identifier is updated); 5) the monitoring ending time (the monitoring ending time of the monitoring task corresponding to the monitoring identifier is updated); 6) the operation to be executed after occurrence of the event (the operation to be executed after occurrence of the event of the monitoring task corresponding to the monitoring identifier is updated); and 7) the monitored terminal.

At act 11, the monitoring receiver may send the monitoring identifier and the parameter to be updated of the monitoring task to the monitoring executor after receiving the monitoring updating request message.

At act 12, the monitoring executor may check whether the monitoring task corresponding to the received monitoring identifier is locally stored or not after receiving the monitoring updating request message. One of the following acts may be executed based on the checking result.

At act 12.1, if the checking result is positive, the parameter of the locally stored monitoring task may be updated based on the parameter to be updated of the monitoring task.

At act 12.2, if the checking result is negative, a monitoring updating denial message may be sent to the monitoring receiver.

A second manner (the monitoring identifier is allocated by the monitoring initiator) may include the following acts.

At act 1, the monitoring initiator may send a monitoring request message to the monitoring receiver. In this exemplary embodiment, the monitoring request message may include an identifier or address of the monitoring initiator, a monitoring identifier and a monitoring task. Parameters included in the monitoring task may be the same as the first manner. The monitoring identifier may be configured to identify the monitoring task.

At act 2, the monitoring receiver may send a response message to the monitoring initiator based on one of the following implementations after receiving the monitoring request message.

At implementation 2.1, the monitoring receiver may indicate successful reception of the monitoring task in the response message if confirming that the monitoring task is able to be executed.

At implementation 2.2, the monitoring receiver may indicate denial of execution of the monitoring task in the response message if confirming that the monitoring task is not able to be executed.

Subsequent acts are the same as those in the first manner.

Descriptions will be made below with reference to exemplary embodiments of the present disclosure.

In the following exemplary embodiments, a monitoring initiator is embodied as a Common Service Entity (CSE) in an M2M system. The monitoring initiator may be configured to provide a management function of a service layer, such as application registration and equipment management, and may belong to a logic entity within the scope of a Service Capability Server (SCS).

A monitoring receiver is embodied as an SCEF or an IWF. The SCEF/IWF is an interface network element of a bearer network for an external network unit, and may be configured to receive a message from a network entity (for example, the SCS) except the bearer network and send a message to the network entity except the bearer network.

A monitoring executor may include an HSS configured to store information of a user in the bearer network, an MME configured to execute mobility management of the user in the bearer network, such as handover, tracking area updating and attachment, and an SGSN. The MME and the SGSN are similar entities, and may be entities with the same function in different bearer networks. The MME/SGSN is adopted for representation in the following exemplary embodiments.

Descriptions will be made below with examples.

First Exemplary Embodiment

The method in the first exemplary embodiment may include the following acts.

At act 1, the CSE may send a monitoring request message to the SCEF/IWF. In this exemplary embodiment, the request message may contain a monitoring task. Possible parameter combinations of the monitoring task may include, but not limited to, at least one of the following combinations: 1) an identifier of a monitored terminal and an event to be monitored; 2) an identifier of a monitored terminal, an event to be monitored and the number of monitoring reporting times; 3) an identifier of a monitored terminal, an event to be monitored and a monitoring duration; 4) an identifier of a monitored terminal, an event to be monitored, a monitoring starting time and a monitoring ending time; 5) an identifier of a monitored terminal, an event to be monitored, a monitoring starting time and a monitoring duration; and 6) an identifier of a monitored terminal, an event to be monitored and an operation to be executed after occurrence of an event.

It may be noted here that various implementation manners may be adopted for the notification of the event parameter to be monitored.

In a first manner, a definition about the event is directly given, including a name of the event and a related parameter, for example:

Event A: monitoring position
{
legal position coordinate;
}.

In a second manner, an event definition list may be sent to the SCEF/IWF in advance by interaction between the CSE and the SCEF/IWF or between the CSE and the HSS, then, the event parameter to be monitored may be an event identifier, for example:

Event-A.

If the event definition list is sent to the SCEF/IWF in advance, after receiving a monitoring request, the SCEF/IWF may perform querying based on the list to learn about that the Event-A is, for example, monitoring whether the terminal is offline or not. If the event definition list is sent to the HSS in advance, after receiving the monitoring request, the SCEF/IWF may perform querying, in a process of sending the monitoring request to the monitoring executor, to the HSS to learn about that the Event-A is, for example, monitoring whether the terminal is offline or not.

At act 2, the SCEF/IWF may send a response message to the CSE based on one of the following implementations after receiving the monitoring request message.

At implementation 2.1, the SCEF/IWF may allocate a monitoring identifier to the monitoring task and include the monitoring identifier in the response message if confirming that the monitoring task is able to be executed. In this exemplary embodiment, the monitoring identifier may be configured to identify the monitoring task.

At implementation 2.2, the SCEF/IWF may indicate denial of execution of the monitoring task in the response message if confirming that the monitoring task is not able to be executed.

At act 3, the SCEF/IWF may send the monitoring task to the monitoring executor. In this exemplary embodiment, the monitoring identifier may be included in the monitoring task, and the monitoring executor may store the monitoring task.

The following execution manner may be adopted for the implementation of the act 3 in the bearer network.

1) The SCEF/IWF may send a subscription data request message to the HSS, the request message containing at least one of a terminal identifier and the monitoring identifier.

The HSS may send a subscription data response message to the SCEF/IWF, the subscription data response message containing an identifier or address of a network element executing monitoring, such as an identifier or address of the MME or an identifier or address of the SGSN.

The SCEF/IWF may send information about the monitoring task to the MME/SGSN, the sent information including the monitoring identifier, or the monitoring identifier and an identifier of the SCEF/IWF.

When there is more than one SCEF/IWF deployed in the bearer network, it may be suggested to send a monitoring report to the right SCEF/IWF according to the identifier of the SCEF/IWF.

2) The SCEF/IWF may send the information about the monitoring task to the HSS, the sent information including the monitoring identifier, or the monitoring identifier and the identifier of the SCEF/IWF.

If monitoring is also required to be executed by another bearer network node, the HSS may send the monitoring task to the other bearer network node. For example, the information about the monitoring task may be sent to the MME or the SGSN, the sent information including the monitoring identifier.

At act 5, the monitoring executor may send the monitoring report to the monitoring receiver after detecting the event to be monitored. In this exemplary embodiment, the monitoring identifier may be contained in the monitoring report.

The following execution manner may be adopted for the implementation of the act 5 in the bearer network.

1) The MME, or the SGSN or the HSS may directly send the monitoring report to the SCEF/IWF.

2) The MME or the SGSN may send the monitoring report to the HSS, and the HSS may forward the monitoring report to the SCEF/IWF.

3) The MME or the SGSN may send the monitoring report to the SCEF/IWF after querying the identifier of the SCEF/IWF from the HSS.

At act 6, the SCEF/IWF may send the monitoring report to the CSE after receiving the monitoring report.

At act 7, if the CSE determines that the specified terminal is not required to be monitored any longer at a certain moment, the CSE may send a monitoring stopping request message to the SCEF/IWF. The request message may contain:

1) a monitoring identifier of the monitoring task to be stopped by the CSE; or, 2) a monitoring identifier of the monitoring task to be stopped by the CSE, and a terminal identifier of the monitored terminal.

Note: the two options are listed here to provide different information which may be required when subscription data is queried from the HSS in the next act. In the related technique, querying about the subscription data to the HSS may require the terminal identifier. However, the solution of the exemplary embodiment also considers a special monitoring scenario, that is, the required information may also be queried by virtue of the monitoring identifier.

At act 8, the SCEF/IWF may send a monitoring termination message to the monitoring executor after receiving the monitoring stopping request message and confirming that the request is able to be executed. The monitoring termination message may contain the monitoring identifier in the monitoring stopping request message sent by the CSE.

The SCEF/IWF may send the monitoring termination message to the monitoring executor in the following manner.

1) The SCEF/IWF may send the subscription data request message to the HSS, the request message containing the terminal identifier or/and the monitoring identifier.

The HSS may send the subscription data response message to the SCEF/IWF. In this exemplary embodiment, the identifier or address of the network element executing monitoring, such as the identifier or address of the MME or the identifier or address of the SGSN, may be contained in the subscription data response message.

The SCEF/IWF may send the monitoring termination message to the MME/SGSN. In this exemplary embodiment, the monitoring identifier may be contained in the monitoring termination message.

2) The SCEF/IWF may send a monitoring termination request to the HSS. In this exemplary embodiment, the monitoring identifier may be contained in the monitoring termination request.

If monitoring is also required to be executed by the other bearer network node, the HSS may send the monitoring termination request to the other bearer network node, for example, the monitoring termination request may be sent to the MME or the SGSN.

At act 9, the HSS, or the MME or the SGSN may check whether information about the monitoring task associated with the received monitoring identifier is locally stored or not after receiving a monitoring termination instruction. One of the following acts may be executed based on the checking result.

At act 9.1, if the checking result is positive, the information about the monitoring task related to the monitoring identifier may be deleted.

At act 9.2, if the checking result is negative, a monitoring termination denial message may be sent to the SCEF/IWF. In this exemplary embodiment, the denial message may indicate nonexistence of the monitoring task.

At act 10, if the CSE is required to modify a certain parameter of the monitoring task, the CSE may send a monitoring updating request message to the SCEF/IWF. In this exemplary embodiment, the request message may contain the monitoring identifier and the parameter to be updated of the monitoring task. The monitoring identifier may be configured to indicate the specific parameter to be updated of the monitoring task. The parameter to be updated of the monitoring task may include one or more of:

1) a monitored event (the monitored event of the monitoring task corresponding to the monitoring identifier is updated); 2) the number of the monitoring reporting times (the number of the monitoring reporting times for the monitoring task corresponding to the monitoring identifier is updated); 3) the monitoring duration (the monitoring duration of the monitoring task corresponding to the monitoring identifier is updated); 4) the monitoring starting time (the monitoring starting time of the monitoring task corresponding to the monitoring identifier is updated); 5) the monitoring ending time (the monitoring ending time of the monitoring task corresponding to the monitoring identifier is updated); 6) the operation to be executed after occurrence of the event (the operation to be executed after occurrence of the event of the monitoring task corresponding to the monitoring identifier is updated); and 7) the monitored terminal (a reason why the terminal identifier is required is the same as that in act 7, and is a requirement of the SCEF/IWF when the subscription data is queried from the HSS).

At act 11, the SCEF/IWF may send the monitoring identifier and the parameter to be updated of the monitoring task to the monitoring executor after receiving the monitoring updating request message and confirming that the request is able to be executed.

The SCEF/IWF may send the monitoring identifier and the parameter to be updated of the monitoring task to the monitoring executor in the following manner.

1) The SCEF/IWF may send the subscription data request message to the HSS, the subscription data request message including the terminal identifier or/and the monitoring identifier.

The HSS may send the subscription data response message to the SCEF/IWF. In this exemplary embodiment, the identifier or address of the network element executing monitoring, such as the identifier or address of the MME or the identifier or address of the SGSN, may be contained in the subscription data response message.

The SCEF/IWF may send the monitoring identifier and the parameter to be updated of the monitoring task to the MME/SGSN.

2) The SCEF/IWF may send the monitoring identifier and the parameter to be updated of the monitoring task to the HSS.

If monitoring is also required to be executed by the other bearer network node, the HSS may send the monitoring identifier and the parameter to be updated of the monitoring task to the other bearer network node, for example, to the MME or the SGSN.

At act 12, the HSS, the MME or the SGSN may check whether the information about the monitoring task corresponding to the received monitoring identifier is locally stored or not after receiving the monitoring identifier and parameter to be updated of the monitoring task. One of the following acts may be executed based on the checking result.

At act 12.1, if the checking result is positive, the parameter of the locally stored monitoring task may be updated based on the parameter to be updated of the monitoring task.

At act 12.2, if the checking result is negative, a monitoring updating denial message may be sent to the SCEF/IWF. In this exemplary embodiment, the denial message may indicate nonexistence of the monitoring task.

Second Exemplary Embodiment

The method in the second exemplary embodiment may include the following acts.

At act 1, the CSE may send a monitoring request message to the SCEF/IWF. In this exemplary embodiment, the request message may contain a monitoring task. Possible parameter combinations of the monitoring task may include, but not limited to, at least one of the following combinations:

1) a monitoring identifier, an identifier of a monitored terminal and an event to be monitored; 2) a monitoring identifier, an identifier of a monitored terminal, an event to be monitored and the number of monitoring reporting times; 3) a monitoring identifier, an identifier of a monitored terminal, an event to be monitored and a monitoring duration; 4) a monitoring identifier, an identifier of a monitored terminal, an event to be monitored, a monitoring starting time and a monitoring ending time; 5) a monitoring identifier, an identifier of a monitored terminal, an event to be monitored, a monitoring starting time and a monitoring duration; and 6) a monitoring identifier, an identifier of a monitored terminal, an event to be monitored and an operation to be executed after occurrence of an event.

Here, the monitoring identifier may be configured to identify the monitoring task.

Various implementation manners may be adopted for the notification of the event parameter to be monitored.

In a first manner, a definition about the event is directly given, including a name of the event and a related parameter, for example:

```
Event A: monitoring position
{
legal position coordinate;
}.
```

In a second manner, an event definition list may be sent to the SCEF/IWF in advance by interaction between the CSE and the SCEF/IWF or between the CSE and the HSS, then, the event parameter to be monitored may be an event identifier, for example:

Event-A.

If the event definition list is sent to the SCEF/IWF in advance, after receiving a monitoring request, the SCEF/IWF may perform querying based on the list to learn about that the Event-A is, for example, monitoring whether the terminal is offline or not. If the event definition list is sent to the HSS in advance, after receiving the monitoring request, the SCEF/IWF may perform querying, in a process of sending the monitoring request to the monitoring executor, to the HSS to learn about that the Event-A is, for example, monitoring whether the terminal is offline or not.

At act 2, the SCEF/IWF may send a response message to the CSE based on one of the following implementations after receiving the monitoring request message.

At implementation 2.1, the SCEF/IWF may indicate successful reception of the monitoring task in the response message if confirming that the monitoring task is able to be executed.

At implementation 2.2, the SCEF/IWF may indicate denial of execution of the monitoring task in the response message if confirming that the monitoring task is not able to be executed.

At act 3, the SCEF/IWF may send the monitoring task to the monitoring executor. In this exemplary embodiment, the monitoring identifier may be included in the monitoring task, and the monitoring executor may store the monitoring task.

The following execution manner may be adopted for the implementation of the act 3 in the bearer network.

1) The SCEF/IWF may send a subscription data request message to the HSS, the request message containing at least one of a terminal identifier and the monitoring identifier.

The HSS may send a subscription data response message to the SCEF/IWF. In this exemplary embodiment, an identifier or address of a network element executing monitoring, such as an identifier or address of the MME or an identifier or address of the SGSN, may be contained in the subscription data response message.

The SCEF/IWF may send information about the monitoring task to the MME/SGSN. In this exemplary embodiment, the sent information may include the monitoring identifier or the monitoring identifier and an identifier of the SCEF/IWF.

When there is more than one SCEF/IWF deployed in the bearer network, it may be suggested to send a monitoring report to the right SCEF/IWF according to the identifier of the SCEF/IWF.

2) The SCEF/IWF may send the information about the monitoring task to the HSS. In this exemplary embodiment, the sent information may include the monitoring identifier or the monitoring identifier and the identifier of the SCEF/IWF.

If monitoring is also required to be executed by another bearer network node, the HSS may send the monitoring task to the other bearer network node. For example, the information about the monitoring task may be sent to the MME or the SGSN, and the sent information may include the monitoring identifier.

At act 5, the monitoring executor may send the monitoring report to the monitoring receiver after detecting the event to be monitored. In this exemplary embodiment, the monitoring identifier may be contained in the monitoring report.

The following execution manner may be adopted for the implementation of the act 5 in the bearer network.

1) The MME, or the SGSN or the HSS may directly send the monitoring report to the SCEF/IWF.

2) The MME or the SGSN may send the monitoring report to the HSS, and the HSS may forward the monitoring report to the SCEF/IWF.

3) The MME or the SGSN may send the monitoring report to the SCEF/IWF after querying the identifier of the SCEF/IWF from the HSS.

At act 6, the SCEF/IWF may send the monitoring report to the CSE after receiving the monitoring report.

At act 7, if the CSE determines that the specified terminal is not required to be monitored any longer at a certain moment, the CSE may send a monitoring stopping request message to the SCEF/IWF. The request message may contain:

1) a monitoring identifier of the monitoring task to be stopped by the CSE; or, 2) a monitoring identifier of the monitoring task to be stopped by the CSE, and a terminal identifier of the monitored terminal.

Note: the two options are listed here to provide different information which may be required when subscription data is queried from the HSS in the next act. In the related technique, querying about the subscription data to the HSS may require the terminal identifier. However, the solution of the exemplary embodiment also considers a special monitoring scenario, that is, the required information may also be queried by virtue of the monitoring identifier.

At act 8, the SCEF/IWF may send a monitoring termination message to the monitoring executor after receiving the monitoring stopping request message and confirming that the request is able to be executed. The monitoring termination message may contain the monitoring identifier in the monitoring stopping request message sent by the CSE.

The SCEF/IWF may send the monitoring termination message to the monitoring executor in the following manner.

1) The SCEF/IWF may send the subscription data request message to the HSS, the request message containing the terminal identifier or/and the monitoring identifier.

The HSS may send the subscription data response message to the SCEF/IWF. In this exemplary embodiment, the identifier or address of the network element executing monitoring, such as the identifier or address of the MME or the identifier or address of the SGSN, may be contained in the subscription data response message The SCEF/IWF may send the monitoring termination message to the MME/SGSN. In this exemplary embodiment, the monitoring identifier may be contained in the monitoring termination message.

2) The SCEF/IWF may send a monitoring termination request to the HSS. In this exemplary embodiment, the monitoring identifier may be contained in the monitoring termination request.

If monitoring is also required to be executed by the other bearer network node, the HSS may send the monitoring termination request to the other bearer network node, for example, the monitoring termination request may be sent to the MME or the SGSN.

At act 9, the HSS, or the MME or the SGSN may check whether information about the monitoring task associated with the received monitoring identifier is locally stored or not after receiving a monitoring termination instruction. One of the following acts may be executed based on the checking result.

At act 9.1, if the checking result is positive, the information about the monitoring task related to the monitoring identifier may be deleted.

At act 9.2, if the checking result is negative, a monitoring termination denial message may be sent to the SCEF/IWF. In this exemplary embodiment, the denial message may indicate nonexistence of the monitoring task.

At act 10, if the CSE is required to modify a certain parameter of the monitoring task, the CSE may send a monitoring updating request message to the SCEF/IWF. In this exemplary embodiment, the request message may contain the monitoring identifier and the parameter to be updated of the monitoring task. The monitoring identifier may be configured to indicate the specific parameter to be updated of the monitoring task. The parameter to be updated of the monitoring task may include one or more of:

1) a monitored event (the monitored event of the monitoring task corresponding to the monitoring identifier is updated); 2) the number of the monitoring reporting times (the number of the monitoring reporting times for the monitoring task corresponding to the monitoring identifier is updated); 3) the monitoring duration (the monitoring duration of the monitoring task corresponding to the monitoring identifier is updated); 4) the monitoring starting time (the monitoring starting time of the monitoring task corresponding to the monitoring identifier is updated); 5) the monitoring ending time (the monitoring ending time of the monitoring task corresponding to the monitoring identifier is updated); 6) the operation to be executed after occurrence of the event (the operation to be executed after occurrence of the event of the monitoring task corresponding to the monitoring identifier is updated); and 7) the monitored terminal (a reason why the terminal identifier is required is the same as that in act 7, and is a requirement of the SCEF/IWF when the subscription data is queried from the HSS).

At act 11, the SCEF/IWF may send the monitoring identifier and the parameter to be updated of the monitoring task to the monitoring executor after receiving the monitoring updating request message and confirming that the request is able to be executed.

The SCEF/IWF may send the monitoring identifier and the parameter to be updated of the monitoring task to the monitoring executor in the following manner.

1) The SCEF/IWF may send the subscription data request message to the HSS, the request message including the terminal identifier or/and the monitoring identifier;

the HSS may send the subscription data response message to the SCEF/IWF. In this exemplary embodiment, the identifier or address of the network element executing monitoring, such as the identifier or address of the MME or the identifier or address of the SGSN, may be contained in the subscription data response message.

The SCEF/IWF may send the monitoring identifier and the parameter to be updated of the monitoring task to the MME/SGSN.

2) The SCEF/IWF may send the monitoring identifier and the parameter to be updated of the monitoring task to the HSS.

If monitoring is also required to be executed by the other bearer network node, the HSS may send the monitoring identifier and the parameter to be updated of the monitoring task to the other bearer network node, for example, to the MME or the SGSN.

At act 12, the HSS, the MME or the SGSN may check whether the information about the monitoring task corresponding to the received monitoring identifier is locally stored or not after receiving the monitoring identifier and parameter to be updated of the monitoring task. One of the following acts may be executed based on the checking result.

At act 12.1, if the checking result is positive, the parameter of the locally stored monitoring task may be updated based on the parameter to be updated of the monitoring task.

At act 12.2, if the checking result is negative, a monitoring updating denial message may be sent to the SCEF/IWF. In this exemplary embodiment, the denial message may indicate nonexistence of the monitoring task.

Obviously, those skilled in the art should know that each module or each act of the exemplary embodiments of the present disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. As a consequence, the present disclosure is not limited to any specific hardware and software combination.

The above is only the exemplary embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

By the exemplary embodiments and exemplary implementation modes, a problem that a monitoring solution not only makes operations of a service platform and a corresponding application complex, but also is low in monitoring efficiency of the monitoring task may be solved. In addition, by executing monitoring processing by interaction based on the monitoring identifier corresponding to the monitoring task, effects of not only effectively reducing a monitoring complexity and monitoring cost but also improving the monitoring efficiency may be achieved.

What is claimed is:

1. A monitoring processing method, comprising:
receiving, by a monitoring receiver, a monitoring request message sent by a monitoring initiator, wherein the monitoring request message contains a monitoring task; and
interacting, by the monitoring receiver, with at least one of the monitoring initiator and a monitoring executor based on a monitoring identifier corresponding to the monitoring task to execute monitoring processing, wherein interacting, by the monitoring receiver, with at least one of the monitoring initiator and the monitoring executor based on the monitoring identifier corresponding to the monitoring task to execute monitoring processing comprises:
sending, by the monitoring receiver, a monitoring execution request message to the monitoring executor, wherein the monitoring execution request message contains the monitoring identifier and the monitoring task;
or,
receiving, from the monitoring initiator by the monitoring receiver, a monitoring termination request message requesting to terminate the monitoring task, wherein the monitoring termination request message contains the monitoring identifier indicating the monitoring task to be terminated; and sending, by the monitoring receiver to the monitoring executor based on the monitoring termination request message, a monitoring stopping request message indicating the monitoring executor to terminate the monitoring task based on the monitoring identifier, wherein the monitoring stopping request message contains the monitoring identifier indicating the monitoring task to be terminated;
or,
receiving, from the monitoring initiator by the monitoring receiver, a monitoring updating request message requesting to update the monitoring task, wherein the monitoring updating request message contains the monitoring identifier indicating the monitoring task to be updated and an updated monitoring parameter of the monitoring task; and sending, by the monitoring receiver to the monitoring executor based on the monitoring updating request message, a monitoring updating request message indicating the monitoring executor to update the monitoring task based on the monitoring identifier and the updated monitoring parameter, wherein the monitoring updating request message contains the monitoring identifier indicating the monitoring task to be updated and the updated monitoring parameter of the monitoring task.

2. The method as claimed in claim 1, wherein
the monitoring identifier is allocated by the monitoring initiator, and is carried in the monitoring request message; or,
the monitoring identifier is allocated to the monitoring task in the monitoring request message by the monitoring receiver after the monitoring receiver receives the monitoring request message sent by the monitoring initiator.

3. The method as claimed in claim 1, before sending, by the monitoring receiver, the monitoring execution request message to the monitoring executor, further comprising:
sending a subscription data request message to a Home Subscriber Server (HSS), wherein the subscription data request message carries at least one of a terminal identifier and the monitoring identifier, wherein the terminal identifier identifies a terminal corresponding to the monitoring task; and determining, based on a subscription data response message received from the HSS, the monitoring executor configured to execute the monitoring task.

4. The method as claimed in claim 1, wherein the monitoring task comprises at least one of the following monitoring parameters:

a monitored terminal, a monitored event, the number of monitoring reporting times, a monitoring duration, a monitoring starting time, a monitoring ending time, and an operation to be executed after occurrence of a monitored event.

5. A monitoring processing method, comprising:

receiving, by a monitoring executor, a monitoring execution request message sent by a monitoring receiver, wherein the monitoring execution request message contains a monitoring identifier identifying a monitoring task and the monitoring task; and executing, by the monitoring executor, monitoring processing on the monitoring task corresponding to the monitoring identifier;

after receiving, by the monitoring executor, the monitoring execution request message sent by the monitoring receiver, the method further comprising:

receiving, from the monitoring receiver by the monitoring executor, a monitoring stopping request message requesting to terminate the monitoring task, wherein the monitoring stopping request message contains the monitoring identifier indicating the monitoring task to be terminated; wherein executing, by the monitoring executor, monitoring processing on the monitoring task corresponding to the monitoring identifier comprises: deleting, by the monitoring executor, the monitoring task based on the monitoring identifier;

or, receiving, from the monitoring receiver by the monitoring executor, a monitoring updating request message requesting to update the monitoring task, wherein the monitoring updating request message contains the monitoring identifier indicating the monitoring task to be updated and an updated monitoring parameter of the monitoring task; wherein executing, by the monitoring executor, monitoring processing on the monitoring task corresponding to the monitoring identifier comprises: updating, by the monitoring executor, a monitoring parameter of the monitoring task into the received monitoring parameter of the monitoring task based on the monitoring identifier in the monitoring updating request message and the updated monitoring parameter of the monitoring task.

6. The method as claimed in claim 5, wherein the monitoring task comprises at least one of the following monitoring parameters:

a monitored terminal, a monitored event, the number of monitoring reporting times, a monitoring duration, a monitoring starting time, a monitoring ending time, and an operation to be executed after occurrence of a monitored event.

7. A monitoring processing device, applied to a monitoring receiver and comprising a hardware processor arranged to execute program modules comprising:

a first receiving module, configured to receive a monitoring request message sent by a monitoring initiator, wherein the monitoring request message contains a monitoring task; and a first processing module, configured to interact with at least one of the monitoring initiator and a monitoring executor based on a monitoring identifier corresponding to the monitoring task to execute monitoring processing;

wherein the first processing module comprises:

a first sending unit, configured to send a monitoring execution request message to the monitoring executor, wherein the monitoring execution request message contains the monitoring identifier and the monitoring task;

or, a first receiving unit, configured to receive from the monitoring initiator a monitoring termination request message requesting to terminate the monitoring task, wherein the monitoring termination request message contains the monitoring identifier indicating the monitoring task to be terminated; and a third sending unit, configured to send, to the monitoring executor based on the monitoring termination request message, a monitoring stopping request message indicating the monitoring executor to terminate the monitoring task based on the monitoring identifier, wherein the monitoring stopping request message contains the monitoring identifier indicating the monitoring task to be terminated;

or, a second receiving unit, configured to receive from the monitoring initiator a monitoring updating request message requesting to update the monitoring task, wherein the monitoring updating request message contains the monitoring identifier indicating the monitoring task to be updated and an updated monitoring parameter of the monitoring task; and a fourth sending unit, configured to send, to the monitoring executor based on the monitoring updating request message, a monitoring updating request message indicating the monitoring executor to update the monitoring task based on the monitoring identifier and the updated monitoring parameter, wherein the monitoring updating request message contains the monitoring identifier indicating the monitoring task to be updated and the updated monitoring parameter of the monitoring task.

8. The device as claimed in claim 7, wherein the monitoring identifier is allocated by the monitoring initiator, and is carried in the monitoring request message; or, the monitoring identifier is allocated to the monitoring task in the monitoring request message by the monitoring receiver after the monitoring receiver receives the monitoring request message sent by the monitoring initiator.

9. The device as claimed in claim 7, wherein the first processing module further comprises:

a second sending unit, configured to send a subscription data request message to a Home Subscriber Server (HSS), wherein the subscription data request message carries at least one of a terminal identifier and the monitoring identifier, wherein the terminal identifier identifies a terminal corresponding to the monitoring task; and a first determination unit, configured to determine, based on a subscription data response message received from the HSS, the monitoring executor configured to execute the monitoring task.

10. An interface network element, located in a bearer network and comprising the device as claimed in claim 7, wherein the interface network element comprises at least one of: a Service Capability Exposure Function (SCEF) and an InterWorking Function (IWF).

11. A monitoring processing device, applied to a monitoring executor and comprising a hardware processor arranged to execute program modules comprising:
- a second receiving module, configured to receive a monitoring execution request message sent by a monitoring receiver, wherein the monitoring execution request message contains a monitoring identifier identifying a monitoring task and the monitoring task; and
- a second processing module, configured to execute monitoring processing on the monitoring task based on the monitoring identifier;
- wherein the hardware processor is arranged to execute program modules further comprising:
- a third receiving module, configured to receive from the monitoring receiver a monitoring stopping request message requesting to terminate the monitoring task, wherein the monitoring stopping request message contains the monitoring identifier indicating the monitoring task to be terminated; and the second processing module is further configured to delete the monitoring task based on the monitoring identifier;

or,
- the hardware processor is arranged to execute program modules further comprising: a fourth receiving module, configured to receive from the monitoring receiver a monitoring updating request message requesting to update the monitoring task, wherein the monitoring updating request message contains the monitoring identifier indicating the monitoring task to be updated and an updated monitoring parameter of the monitoring task; and the second processing module is further configured to update a monitoring parameter of the monitoring task into the received monitoring parameter of the monitoring task based on the monitoring identifier in the monitoring updating request message and the updated monitoring parameter of the monitoring task.

12. Monitoring equipment, located in a bearer network and comprising the device as claimed in claim 11, wherein the monitoring equipment comprises at least one of: a Home Subscriber Server (HSS), a Mobility Management Entity (MME) and a Serving General Packet Radio Service (GPRS) Supporting Node (SGSN).

* * * * *